United States Patent [19]

Brown et al.

[11] Patent Number: 5,487,309

[45] Date of Patent: Jan. 30, 1996

[54] DEVICE FOR TESTING MEDICAL INFUSION

[76] Inventors: Malcolm C. Brown, 23 Carpenters Lane, West Kirby, Wirral L48 7EX; Paul E. Hammond, 18 Townfield Road, West Kirby, Wirral, both of United Kingdom

[21] Appl. No.: 207,703

[22] Filed: Mar. 9, 1994

Related U.S. Application Data

[63] Continuation-in-part of Ser. No. 910,908, Jun. 8, 1992, abandoned.

[30] Foreign Application Priority Data

Jun. 8, 1991 [GB] United Kingdom .................... 9112351

[51] Int. Cl.$^6$ .............................. G01F 1/00; A61M 31/00
[52] U.S. Cl. ..................................... 73/861; 604/65
[58] Field of Search ................... 73/861, 861.05, 73/223; 128/DIG. 12, DIG. 13, 691; 604/65

[56] References Cited

U.S. PATENT DOCUMENTS

| | | | |
|---|---|---|---|
| 1,101,502 | 6/1914 | Humphreys | 73/861 |
| 4,051,431 | 9/1977 | Wurster | 73/861 |
| 4,100,797 | 7/1978 | Oberhardt | 73/861 |
| 4,397,189 | 8/1983 | Johnson et al. | 73/861 |
| 4,856,343 | 8/1989 | Hon | 73/861 |
| 4,938,072 | 7/1990 | Brown et al. | 73/861 |

Primary Examiner—Kenneth A. Wieder
Assistant Examiner—William L. Oen
Attorney, Agent, or Firm—Oblon, Spivak, McClelland, Maier & Neustadt

[57] ABSTRACT

A medical infusion testing device has a pair of identical measuring tubes with valves to direct flow to one tube while draining the one tube down to a predetermined level. The level of liquid in the tubes is measured by an optical charge coupled device. A logic device is arranged to measure a spot reading over a small flow or an averaged flow over an entire reading.

4 Claims, 2 Drawing Sheets

DEVICE FOR TESTING MEDICAL INFUSION

REFERENCE TO RELATED APPLICATION

This is a continuation-in-part of U.S. patent application Ser. No. 07/910 908 filed 8th Jun. 1992, now abandoned.

FIELD OF THE INVENTION

The present invention relates to a medical infusion device testing device based on such a device as described in U.S. Pat. No. 4,938,072.

BACKGROUND OF THE INVENTION

It is important in the treatment of patients that they receive the correct dosage of drugs or saline drips at a defined rate. This is done by medical infusion devices of which there are many types ranging from motorized hypodermics and small diaphragm cassettes for low flow rates of 1 milliliters per hour to drip feeds for higher flow rates of say 1 liter per hour. However it is necessary to test the infusion device to ensure its performance. Since especially the low flow rate devices have an intermittent flow rate, the flow can be described as "lumpy". While it would be possible to have a testing device for each type of infusion device, it is desirable to have a common testing device for as many types of infusion devices as possible. U.S. Pat. No. 4,938,072 describes a testing device for a range of infusion devices. The device is the optical measurement type sensing when a liquid level in a tube moved between two levels and then dividing the volume between the two levels by the time taken to move between the two levels to derive the flow rate. This type of testing device does not measure instantaneous flow rates which could fluctuate wildly and could even on an oscilloscope would resemble "grass". The improvement provided by U.S. Pat. No. 4,938,072 was to reject any flow rate if a logic means sensed that the second level had been reached too quickly and let the flow go on to a third level so another calculation of flow rate could be made; this again being timed and rejected depending on how many detectors were used. A flow rate reading is nevertheless a spot reading whose accuracy with pulsed flow rates depends on whether the uppermost level is reached at the start or at the end of a pulse. Of course it would be possible to use a greater volume between the levels but then a reading would take a long period of time. There is another difficulty with testing devices using the time of passage between two levels in a single tube, which is that the tube has to be drained between each spot reading and during this drainage no reading can be taken so that even letting the testing device run continuously gives no more than a series of spot readings, each of which has a tolerance with respect to accuracy.

SUMMARY OF THE INVENTION

The present invention provides a medical infusion testing device using an optical means to sense levels of a fluid in a tube and logic means to calculate the flow rate from the time taken for the fluid to pass two levels, which includes a pair of identical tubes, valve means arranged to feed the fluid to one tube and to drain the fluid from the other tube down to a predetermined level, wherein the optical means is a charge coupled device sensing the fluid level substantially continuously along the entire length of each tube and wherein the logic means calculates flow rates when the fluid is rising in one tube but inhibits a display of the flow if the calculation is based on too small a change of level, the optical means sensing when the fluid level approaches the top of a tube, and signalling the logic means so as to cause the valve means to direct the flow to the other tube so measurement continues smoothly, the optical means and logic means also draining the full tube down near the bottom and then sealing off this tube and wherein a control module operable by an operator can trigger the logic means between a state reading spot readings and an averaged reading.

More particularly, the invention is directed to a testing device for medical infusion, the testing device including optical means for sensing levels of a fluid in a tube and logic means for calculating a flow rate based upon the time taken for the fluid to pass between two levels, a first and second tube, said tubes being substantially identical, valve means for feeding the fluid to the first tube and draining the fluid from the second tube down to a predetermined level, wherein the optical means comprises a charge coupled device for sensing the fluid level substantially continuously along the entire length of each of the first and second tube and wherein the logic means calculates flow rates when the fluid is rising in one of said first and second tubes but inhibits a display of the flow rate if the calculation is based on too small a change of level, the optical means sensing when the fluid level approaches the top of one of the first and second tubes and signaling the logic means so as to cause the valve means to direct the flow of the fluid to the other of said first and second tubes so that measurement continues smoothly wherein the optical means and logic means are arranged to drain said one of said first and second tubes when full, down to near a bottom portion of said one tube and to then seal off said one tube and wherein a control module is provided to display spot and average flow rate readings.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
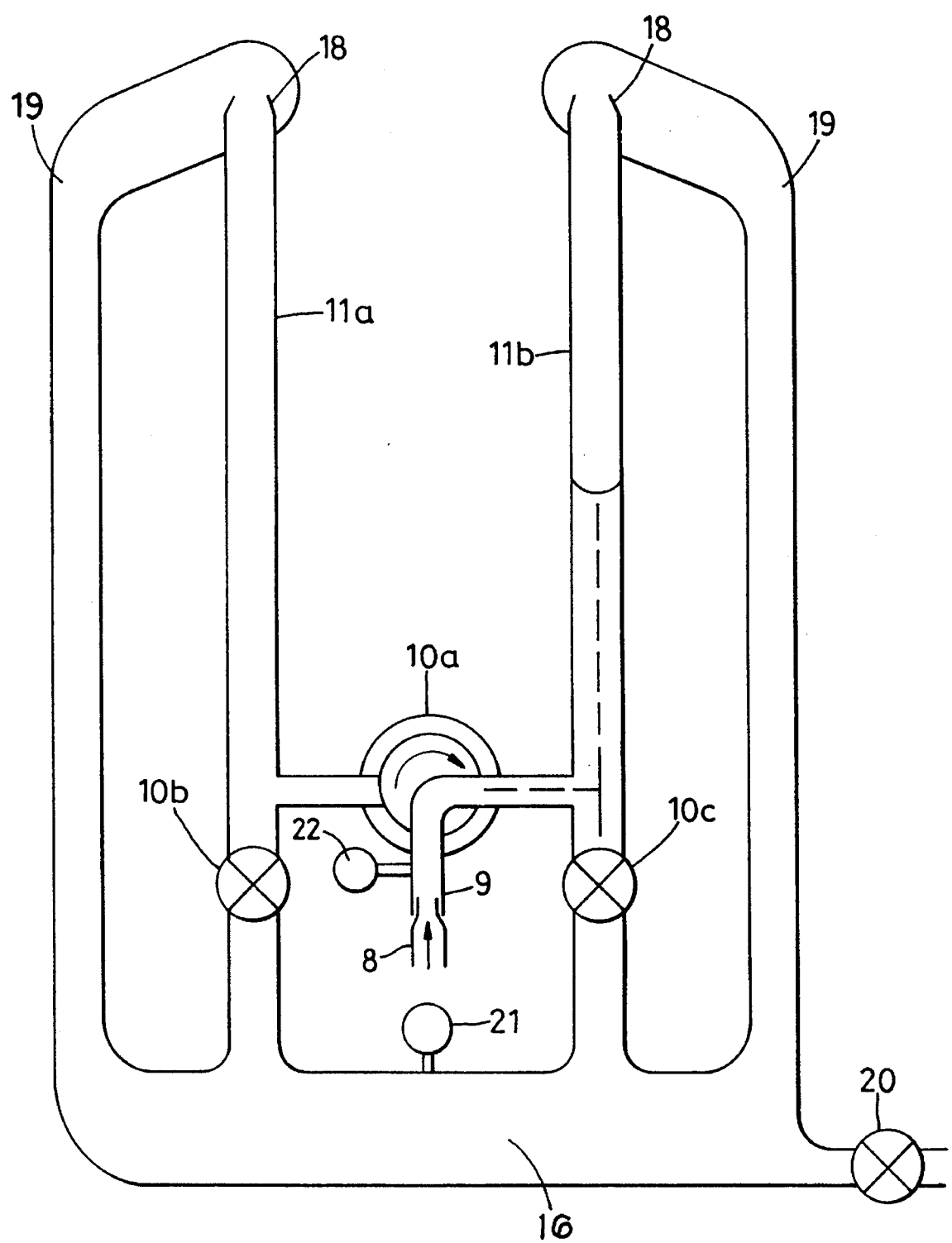
FIG. 1 illustrates a medical infusion testing device having two upright measuring tubes and FIG. 2 illustrates a control arrangement for the device of FIG. 1.
Figure 2:
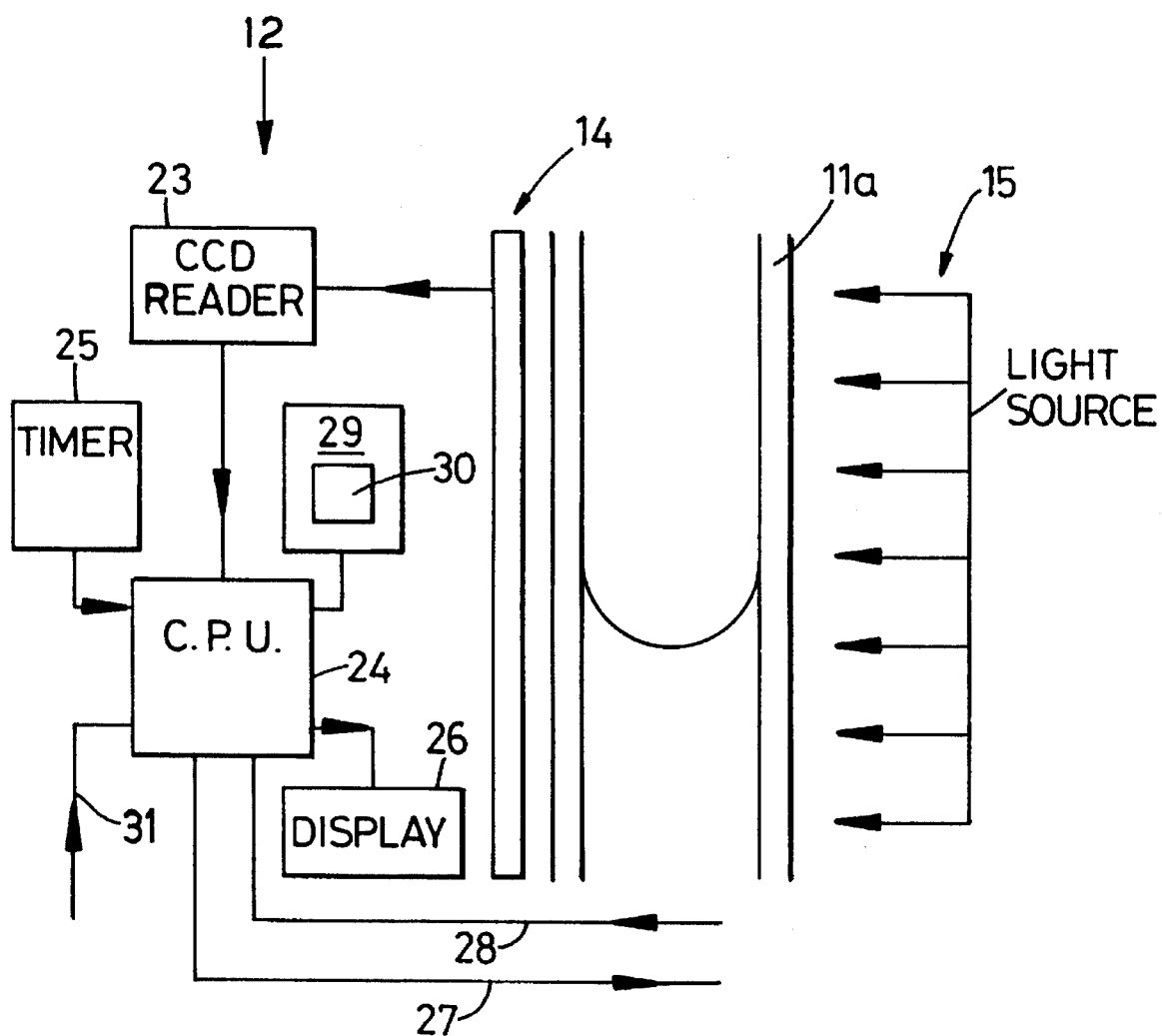

FIG. 1 shows an outlet 8 of a medical infusion device undergoing testing and joined to an inlet 9 of a testing device. From this inlet the flow from the infusion device is fed under the control of valves 10a, 10b and 10c to one or the other of two identical measuring tubes 11a and 11b. In fact the valve 10a directs the flow to one tube and the valves 10b and 10c, if open, drain each respective tube. As shown, the flow is directed to the tube 11b and when the level in that tube reaches the top, a signal is given to logic means 12 from a charge coupled device 14 illuminated from a light source 15, as illustrated in FIG. 2. There is a charge coupled device associated with each tube. The logic means 12 will operate the valve 10a and arrange for the charge coupled device associated with tube 11a to start counting of levels passed while opening valve 10c drains the tube 11b to a sump 16, when the level in tube 11b drops to near the bottom as sensed by the charge coupled device the valve 10c is reclosed to reset the tube 11b so as to be ready when the tube 11a is nearly full. Returning to FIG. 1, each measuring tube terminates as a convergent nozzle 18 which enters a wide bore tube 19. The nozzle breaks up the size of liquid drops leaving the top of a measuring tube and the tube 19 has a bore of, for example 8 millimeters so the drops cannot bridge the tube 19 but run off down the sides minimizing the risk of an air/liquid mixture re-entering a measuring tube. The tubes 19 lead down to the sump 20 which can be sealed off by a valve 21 and pressurized by a pump 21, so the testing device can be used with a back pressure. A pressure transducer 22 can be provided in the inlet 9 to measure the output pressure of the infusion devices.

FIG. 2 is a simplified block diagram showing the logic means 12. This comprises a pulse generator or other circuit 23 for converting the output of the charge coupled device 14 from the measuring tube in use to a signal proportional to the height reached in the tube, a central processing unit 24, a clock or timer 25, a display unit 26, output lines 27 and 28 controlling the valves 10a, 10b and 10c, an operator's control module 29, and a switch 30. Under the control of the switch 30, the logic means can switch off all the valves 10a, 10b and 10c and then switch on flow to one tube 11a or 11b to measure the surge or bolus volume in which case time measurement is not needed. This bolus volume can be displayed or printed out. 8Under the control of the module 29, the logic means can feed the signal of the occlusion pressure from the pressure transducer 21 to the display. The main displayed signals are either a current, incremental, or spot flow derived from the time taken for a level as sensed by the charge coupled device to change a predetermined small amount (which can be varied on the module) or an averaged flow wherein the flow volume is continuously sensed and timed and the volume divided by the time so as to give an averaged flow. The logic means can be provided with input lines 31 to correct measurements of tube volume by length against variations in tube section. The pair of output lines 27, 28 are also provided for each valve 10a, 10b or 10c.

We claim:

1. A testing device for a medial infusion device, the testing device comprising:

optical means for sensing levels of a fluid in a tube and logic means for calculating a flow rate based upon the time taken for the fluid to pass between two levels, a first and second tube, said tubes being substantially identical, valve means for feeding the fluid to the first tube and draining the fluid from the second tube down to a predetermined level, wherein the optical means comprises a charge coupled device for sensing the fluid level substantially continuously along the entire length of each of the first and second tubes and wherein the logic means calculates flow rates when the fluid is rising in one of said first and second tubes but inhibits a display of the flow rate if the calculation is based on too small a change of level, the optical means sensing when the fluid level approaches the top of one of the first and second tubes and signaling the logic means so as to cause the valve means to direct the flow of the fluid to the other of said first and second tubes so that measurement continues smoothly, wherein the optical means and logic means are arranged to drain said one of said first and second tubes when full, down to near a bottom portion of said one tube and to then seal off said one tube and a control module for displaying spot and average flow rate readings.

2. A testing device according to claim 1, wherein the testing device includes means for measuring the change of fluid level after first closing the valve means for blocking fluid flow to one of the first and second tubes and then opening the valve means for permitting fluid flow to the one tube such that a bolus volume is calculated.

3. A testing device for a medical infusion device, the testing device comprising:

an optical device sensing levels of a fluid in a tube and a logic device calculating a flow rate based upon the time taken for the fluid to pass between two levels;

a first and second tube, said tubes being substantially identical;

a valve feeding the fluid to the first tube and draining the fluid from the second tube down to a predetermined level, wherein the optical device includes a charge couple device sensing the fluid level substantially continuously along the entire length of each of the first and second tubes and wherein the logic device calculates flow rates when the fluid is rising in one of said first and second tubes but inhibits a display of the flow rate if the calculation is based on too small change of level, the optical device sensing when the fluid level approaches the top of one of the first and second tubes and signaling the logic device so as to cause the valve to direct the flow of the fluid to the other of said first and second tubes so that measurement continues smoothly, wherein the optical device and logic device drain said one of said first and second tubes when full, down to near a bottom portion of said one tube and to then seal off said one tube, and a control module displaying spot and average flow rate readings.

4. A testing device according to claim 3, wherein the testing device includes a device measuring the change of fluid level after first closing the valve blocking fluid flow to one of the first and second tubes and then opening the valve preventing fluid flow to the one tube such that a bolus volume is calculated.

* * * * *